United States Patent [19]

Baugh et al.

[11] 4,450,857

[45] May 29, 1984

[54] DEVICE FOR TAPPING AND PLUGGING A FLUID CONDUCTOR

[75] Inventors: John L. Baugh, Huntsville; James W. Montgomery, Houston, both of Tex.

[73] Assignee: Hughes Tool Company, Houston, Tex.

[21] Appl. No.: 291,661

[22] Filed: Aug. 10, 1981

[51] Int. Cl.³ .............................................. B23B 39/00
[52] U.S. Cl. ..................................... 137/318; 408/87; 408/137
[58] Field of Search .................. 137/317, 318; 408/11, 408/16, 124, 129, 132, 134, 137, 87

[56] References Cited

U.S. PATENT DOCUMENTS

| | | | |
|---|---|---|---|
| 2,110,537 | 3/1938 | Tautz | 408/16 |
| 3,974,846 | 8/1976 | Serota | 137/318 X |
| 4,342,528 | 8/1982 | Nozu | 408/11 |

FOREIGN PATENT DOCUMENTS 953541  8/1974  Canada ................................. 408/11

OTHER PUBLICATIONS

P. 81 from Brown Oil Tool General Catalogue for 1980–1981.

*Primary Examiner*—Martin P. Schwadron
*Assistant Examiner*—Stephen M. Hepperle
*Attorney, Agent, or Firm*—Robert A. Felsman; Charles D. Gunter, Jr.

[57] ABSTRACT

An improved device for tapping and plugging fluid conductors under high pressure has independently operable feed and cutting motors for improved cutting action. The device has a cutter housing which is mounted on the exterior of the fluid conductor to be tapped. A cutter in the housing is adapted to be driven along a drive axis transverse to the longitudinal axis of the fluid conductor. A feed motor in the housing drives the cutter along the drive axis. An independent cutter motor located in the housing is provided to selectively impart rotary cutting action to the cutter as the cutter is driven along the drive axis. A digital counter associated with the feed motor determines the precise location of the cutter on the drive axis to allow the cutter to be operated remotely.

8 Claims, 6 Drawing Figures

DEVICE FOR TAPPING AND PLUGGING A FLUID CONDUCTOR

BACKGROUND OF THE INVENTION

This invention relates to devices for tapping and plugging fluid conductors carrying fluids under high pressure and in particular to hot tap devices for oil well pipe, tubing, and casing, under high pressure such as exists during a well blowout.

History suggests that despite increased safety measures and higher safety standards now being achieved, that the production of hydrocarbons from offshore locations will not occur without occasional well blowouts. Various techniques have been employed in the past to attempt to kill well blowouts such as the techniques of top entry onto the drilling platform, bottom entry by deviated drilling below the surface and side entry, i.e., entering laterally to plug the blowing string.

The concept of side entry is known and commonly employed in blowouts of small diameter tubing. The tubing is first crimped to reduce the internal bore diameter. The tubing is then tapped followed by the injection of material to block the tubing string at the crimp point. Although this technique works satisfactorily for small diameter tubing, crimping is not practical for larger diameter pipe and casing.

Since top entry is not always successful and bottom entry generally takes a long period of time, there exists the need for a side entry device which does not require crimping, especially for underwater applications such as platforms located in the North Sea. Prior side entry devices have suffered from a number of short-comings. The devices have tended to be extremely long and unwieldly. For instance, one previous design is over twelve feet in length. Prior designs have generally embodied cutting elements which work against the pressure in the well annulus making cutting extremely difficult. The prior designs have also commonly employed a single motor for driving the cutting element in the lateral direction toward the fluid conductor and for providing cutting rotation for the cutting element. The use of a single motor for driving and rotating the cutting element fails to produce a good cutting action in that the lateral feed rate cannot be coordinated with the speed of rotation of the cutting element. Certain of the prior designs also required the operator to be present in the immediate vicinity of the blowing conductor in order to operate the device. This increased the danger to the operating personnel, especially at the point of tapping into the conductor.

SUMMARY OF THE INVENTION

It is therefore an object of this invention to provide a device for tapping and plugging a fluid conductor which can be remotely operated.

It is another object of this invention to provide a device for tapping and plugging a fluid conductor in which the speed at which the cutting element is laterally advanced toward the conductor and the speed of rotation of the cutting element can be coordinated to provide improved cutting action.

The improved device for tapping a fluid conductor includes a cutter housing and a mounting means for mounting the cutter housing on the exterior of the fluid conductor to be tapped. Cutter means are located in the housing and are adapted to be driven along a drive axis transverse to the longitudinal axis of the fluid conductor. A feed motor located in the housing drives the cutter means along the drive axis. A cutter motor also located in the housing selectively imparts a rotary cutting action to the cutter means as the cutter means is driven along the drive axis. The feed motor and the cutter motor are independently operable.

In the preferred embodiment, an externally threaded lead screw is mounted in a fixed position within the cutter housing. An internally threaded feed nut is threaded onto the lead screw with the feed nut threads mating with the lead screw threads so that the feed nut is rotatably movable along the lead screw exterior. The feed nut also has at least one lug roller located on the exterior thereof. A cylindrical drive spindle surrounds the lead screw within the housing. The drive spindle has an upper extent and a lower extent, the lower extent being contacted by the feed nut as the feed nut moves along the lead screw exterior.

A cylindrical cutter is provided having a cutting end for tapping the fluid conductor and an opposite end. The opposite end is connected to the drive spindle upper extent. A feed sleeve surrounds the drive spindle within the housing an has at least one interior longitudinal slot. The longitudinal slot is adapted to receive the feed nut lug roller whereby rotation of the feed sleeve causes rotation of the feed nut. A feed motor operably associated with the feed sleeve rotates the feed sleeve.

A drive sleeve is positioned about the drive spindle in the housing. The drive sleeve has drive dogs pivotally attached to the drive sleeve. The drive dogs are adapted to selectively engage the drive spindle exterior at a predetermined point for rotating the drive spindle. A drive motor independent of the feed motor and operably associated with the drive sleeve rotates the drive sleeve.

Additional objects, features, and advantages will be apparent in the following description.

DETAILED DESCRIPTION OF THE INVENTION

Figure 1:
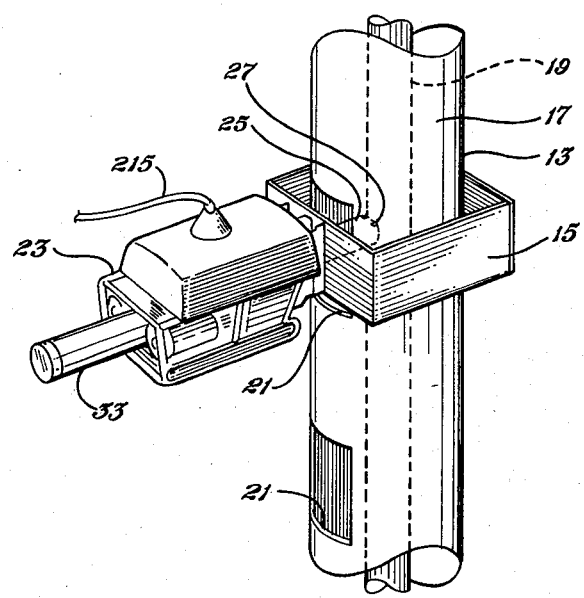
FIG. 1 is a perspective view of the device of the invention in placed on a fluid conductor.

Turning now to FIG. 1, there is shown an improved tapping and plugging device secured to the exterior of an oil well casing 13 by means of a bolt-on frame 15. Within the production annulus 17 inside casing 13 is located a string of production tubing 19 which is the object of the tap. Access to the production tubing 19 is achieved by cutting two sets of front and back windows 21 in the casing 13 with torches, flexible linear cutting charges, or by other known methods. The cutter housing 23 is then bolted onto the outside of casing 13 by frame 15, thereby allowing an inwardly extending valve region 25 of the tapping device to contact a section of production tubing 19 and seal off the same by means of front and back saddle seals 27.

Figure 2:
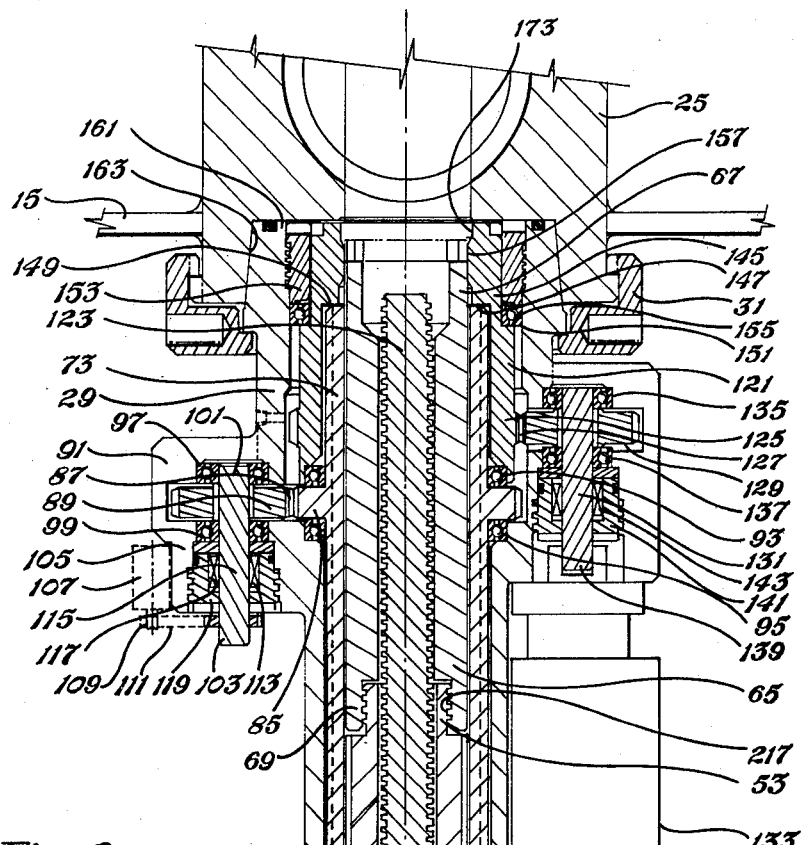
FIG. 2 is a top cross-sectional view of that portion of the device of FIG. 1 which extends outward from the conductor.
Figure 2:
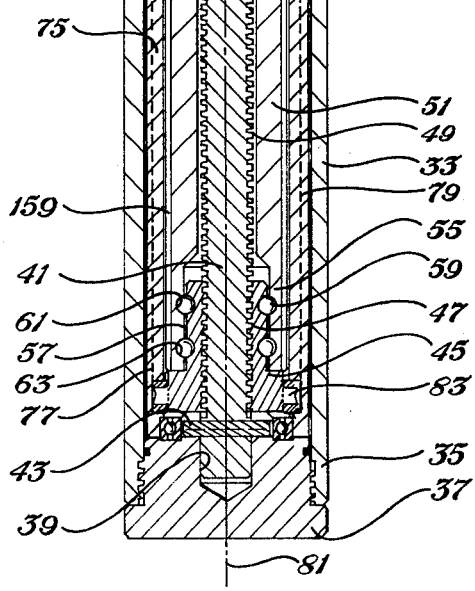

The cutter housing 23 is shown in greater detail in FIG. 2. The cutter housing 23 includes an outer body 29 which is removably attached to the valve region 25 of the tool by means of bayonette mounts 31. Body 29 includes an elongated cylindrical portion 33 which extends outward from valve region 25 along an axis transverse to the longitudinal axis of the casing 13. The end 35 of elongated portion 33 is internally threaded to receive an external threaded solid end piece 37. End piece 37 has a centrally located internal bore or cavity 39 adapted to receive one end of an externally threaded lead screw 41 where it is mounted in a fixed position within housing 23 by a lock pin 43.

An internally threaded feed nut 45 is threaded onto the lead screw 41 with the feed nut threads 47 mating with the lead screw threads 49 so that the feed nut 45 is rotatably movveable along the lead screw exterior. A cylindrical drive spindle 51 surrounds the lead screw 41 within elongated portion 33 of body 29 and has an upper extent 53 and a lower extent 55. The lower extent 55 of drive spindle 51 is spaced apart from the exterior surface 57 of feed nut 45 by means of balls 59 in upper and lower ball races 61, 63, respectively. As can be seen in FIG. 2, movement of feed nut 45 in the direction of valve region 25 drives cylindrical drive spindle 51 along a drive axis transverse to the longitudinal axis of the fluid conductor. Balls 59 and races 61, 63 also permit drive spindle 51 to be rotated about lead screw 41.

A cylindrical cutter 65 having a cutting end 67 and an opposite end 69 is threadedly connected at opposite end 69 to the drive spindle upper extent 53. Cutter 65 and drive spindle 51 together comprise a cutting means or cylinder surrounding lead screw 41 and having a leading cutting end 67 and a trailing end 55. The trailing end 55 is contacted by the feed nut 45 as the feed nut moves along the lead screw exterior, thereby driving the cutting cylinder along a drive axis transverse to the longitudinal axis of the fluid conductor or casing 13.

A cylindrical feed sleeve 71 having an upper region 73, mid region 75 and lower region 77 surrounds the drive spindle 51 and cutter 65 when spindle 51 and cutter 65 are in the retracted or starting position shown in FIG. 2. Cylindrical feed sleeve 71 has a pair of oppositely facing interior slots 79. Slots 79 are preferably positioned 180° apart on the interior surface of feed sleeve 71 and run parallel to drive axis 81. The interior longitudinal slots 79 in feed sleeve 71 are adapted to receive oppositely facing feed nut lug rollers 83 rotatably mounted on the exterior surface of feed nut 45. In this way, rotation of feed sleeve 71 causes rotation of feed nut 45 while allowing lug rollers 83 to move inwardly in the direction of valve region 25 by traveling in slots 79.

The upper region 73 of cylindrical feed sleeve 71 has a circumferential driven gear 85 formed in an upset of the exterior surface thereof which has teeth 87 which mesh with the teeth of a mating drive gear 89 of a feed motor 91. Driven gear 85 of feed sleeve 71 rides between an inner ball race 93 and an outer ball race 95 in housing 23. Drive gear 89 of feed motor 91 is similarly mounted between inner and outer ball races 97, 99, respectively. Drive gear 89 is mounted on an output shaft 101 of feed motor 91. Output shaft 101 is mounted in alignment with drive axis 81 and has an outer end 103 which extends outward from the motor exterior 105.

A digital counter 107 is mounted on motor exterior 105 and has a driven shaft 109 which is operably associated with output shaft 101 of feed motor 91 by means of a belt 111. Digital counter 107 measures the number of revolutions which output shaft 101 makes which in turn measures the number of revolutions of feed sleeve 71. The precise location of the cutter 65 on the lead screw 41 and hence the distance of the cutting end 67 from the object to be tapped can be determined by correlating the number of revolutions the feed sleeve 71 has made to the distance feed nut 45 has traveled along lead screw 41.

Packing 113 is provided around mid region 115 of output shaft 101 to provide a pressure tight seal. Packing 113 is received within a recess 117 in feed motor cap 119.

A cylindrical drive sleeve 121 is positioned about the upper end 123 of lead screw 41 in housing body 29 and surrounds cutter 65 when cutter 65 is in the retracted position as shown in FIG. 2. Drive sleeve 121 has a generally cylindrical lower end 125 which has a circumferential driven gear 127 formed in the exterior surface thereof. Gear 127 meshes with a drive gear 129 fixed to the drive shaft 131 of a cutter motor 133. Drive gear 129 of cutter motor 133 is mounted between upper and lower ball races 135, 137 respectively, and has an outward end 139 extending from a threaded plug 141. Plug 141 has an internal bore containing packing 143 similarly arranged to that in the feed motor 91.

Drive sleeve 121 also has an upper end 145 of lesser internal diameter than lower end 125 thereby forming a shoulder 147 on which is received the inner end 149 of feed sleeve 71. A ball race 151 contained between body wall 153 and an external shoulder 155 in drive sleeve 121 along with inner race 93 rotatably mount drive sleeve 121 about cylindrical cutter 65. A pair of drive dogs 157 are pivotally mounted in drive sleeve 121 and are adapted to selectively engage the drive spindle exterior at a predetermined point for rotating the drive spindle 51. Drive spindle 51 is provided with oppositely facing external grooves 159 for receiving drive dogs 157. The exterior surface of cylindrical cutter 65 is not grooved.

The cutting motor 133, drive sleeve 121, dogs 157, and grooves 159 in drive spindle 51 together comprise cutter motor means located in the housing 23 for selectively imparting rotary cutting action to the cutter as the cutter is driven along the drive axis 81 by the feed nut 45. The feed motor 91 and the cutter motor 133 are independently operable to allow both the rate of advancement of the cutter 65 along the drive axis 81 and the speed of rotation of the cutter 65 to be adjusted for optimum cutting action.

As shown in FIG. 2, the inner end 161 of the device is received within a matching recess 163 in a valve region 25 where it is held in position by bayonette mounts 31. Valve region 25 is mounted on the casing 13 by means of bolt-on frame 15 with the inner extent 165 (FIG. 3) of valve region 25 extending through a window (21 in FIG. 1) previously cut in the casing 13. Valve region 25 includes a longitudinal flow passage 167 which communicates with the exterior surface 169 of production tubing 19 and which communicates across valve 171 (shown in the closed position in FIG. 3) with the bore 173 of cutter housing 23. The inner extent 175 of valve region 25 containing flow passage 167 fits within a recess 177 in region 25 where it is secured by screw locks 179. The end surfaces 181 of inner extent 175 sealingly engage a portion of the production tubing exterior 169 by means of saddle seals 27.

The exterior surface 183 of production tubing 19 opposite surface 169 is likewise sealingly engaged by saddle seals 185 in the ends 191 of a support member 187. Both support member 187 and inner extent 175 of valve region 25 have slanted screw locks 193, 195, respectively. Support member 187 also has a flow passage 189 which is aligned with longitudinal passage 167 in inner extent 175. Support member 187 is held in position on tubing 19 by an adjustable screw 197 having threads 199 which matingly engage the internal threads 201 of a retainer nut 203 held in position by frame 15. The plug end 207 of screw 197 sealingly engages the interior sidewalls of support member 187 by means of a seal ring 205. Seal ring 209 on the outer surface 211 of support member 187 sealingly engages an external shoulder 213 in screw 197.

Figure 3:
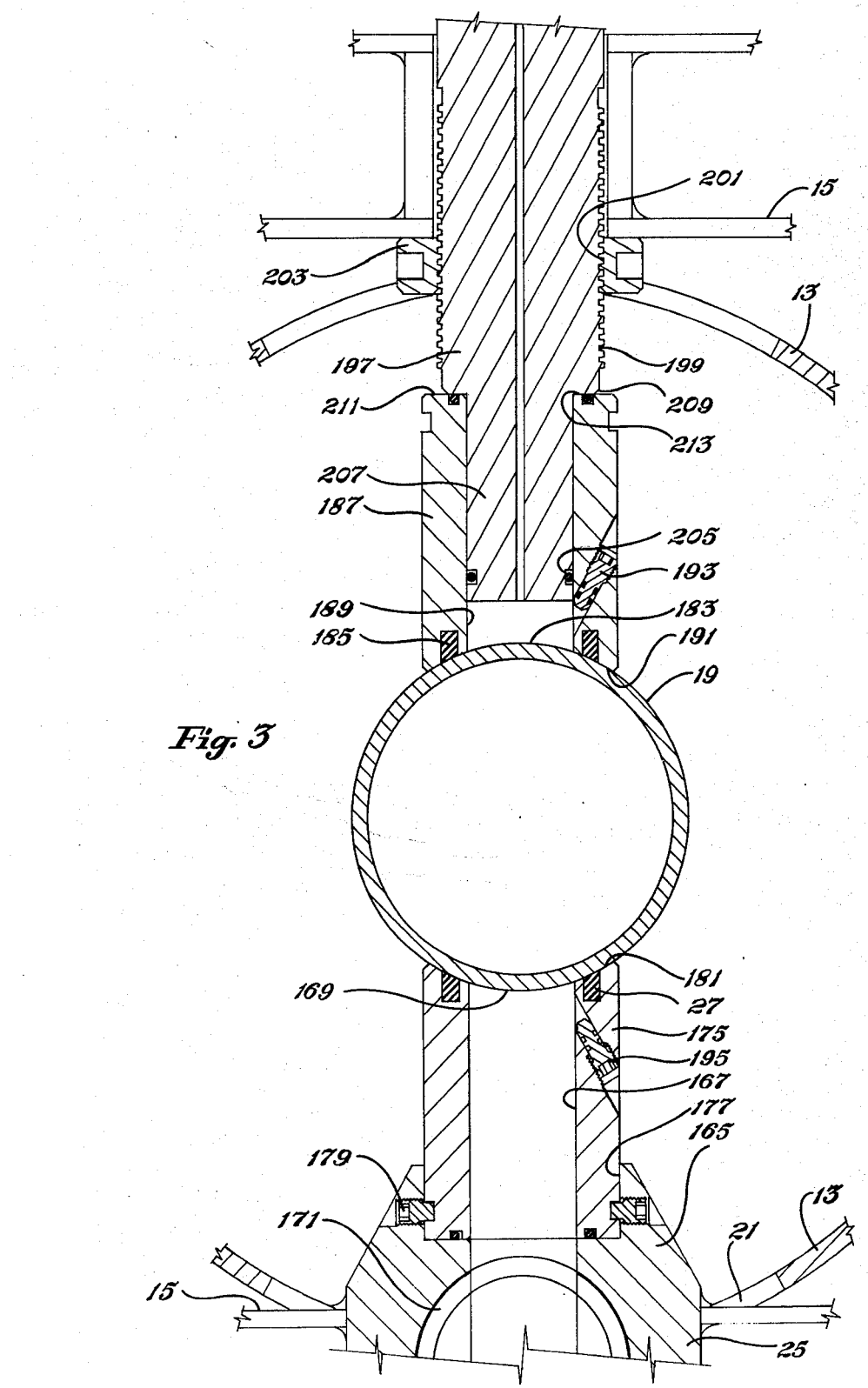
FIG. 3 is a top cross-sectional view of that portion of the device of FIG. 1 which extends inwardly into the fluid conductor.

The operation of the device will now be described. The valve region 25 of the device is mounted in the upper window previously cut in the casing tubing by means of a bolt-on frame 15. The inner extent 175 sealingly engages a region of the production tubing for tapping. The support member 187 is mounted on the opposite side of the production tubing through a window in the casing as previously discussed. The cutter 65 is in the retracted position shown in FIG. 2 and valve 171 is closed as shown in FIG. 3. Valve 171 is now opened and feed motor 91 is activated by providing current through a conduit 215 from a remote source thereby driving output shaft 101 which drives feed sleeve 71 through driven gear 85. Rotation of feed sleeve 75 within cylindrical portion 33 of cutter housing 23 acts through lug rollers 83 to cause feed nut 45 to rotate and thus travel down the threaded exterior 49 of lead screw 41 in the direction of valve region 25.

The exterior surface 57 of feed nut 45 contacts the lower extent 55 of drive spindle 51 thereby forcing drive spindle 51 along drive axis 81 in the direction of valve region 25. Lug rollers 83 of feed nut 45 travel in oppositely facing slots 79 in the interior of feed sleeve 75. As drive spindle 51 begins to move in the direction of valve region 25, drive spindle 51 and cutter 65 are not rotating.

The precise location of cutter 65 on lead screw 41 is recorded by digital counter 107 and relayed to the operator. This can be accomplished by electrical impulses being transmitted through conduit 215 to a display readout at the remote operator location. Based upon the previously determined relationship between the number of revolutions which the feed motor drive shaft 101 turns and the distance feed nut 45 travels along the lead screw 41, the exact position of cutter 65 can be determined. Thus, for example, one revolution of shaft 101 may equal 1/1000 feet of travel of nut 45. By knowing this relationship, the cutter 65 can be run down the lead screw 41 to contact the production tubing 19 without requiring an operator to be present in the near vicinity of the blow-out.

Figure 4:
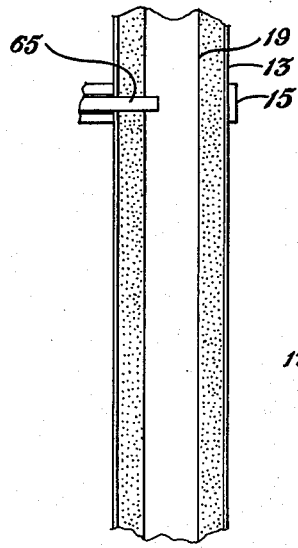
FIG. 4 is a simplified view of the operation of the device showing the upper tap.

Once the cutter 65 has contacted the production tubing, the cutter motor 133 is activated and drive sleeve 121 is driven by drive gear 129 acting through driven gear 127. As cutter 65 was moving down bore 173 in the direction of production tubing 19, the drive dogs 157 in drive sleeve 121 were riding on the smooth exterior surface of the cutter 65. At a predetermined location, dogs 157 engage the grooved exterior of drive spindle 51 whereby rotation of drive sleeve 121 causes rotation of drive spindle 51 about the drive axis 81 to provide a controlled cutting action. The initial penetration of the cutter element 65 through the production tubing 19 is shown in simplified fashion in FIG. 4.

Figure 5:
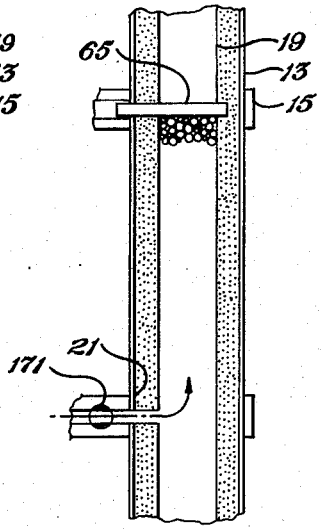
FIG. 5 is a simplified view similar to FIG. 4 showing the lower tap.

The plugging feature of the invention will now be described, although it should be understood that the present device can be used for tapping only. To plug the tubing 19, cutter 65 is run through surfaces 169 and 183 of tubing 19 and the cutter element 65 is then locked into position by tightening screw locks 193, 195. With the cutter 65 thus wedging the bore of the tubing and the cutter motor off, the feed motor would then be powered in reverse to back off the drive spindle 51. The threaded connection 217 (FIG. 2) between upper extent 53 of drive spindle 51 and opposite end 69 of cutter 65 would then break leaving cutter 65 in place in the bore of production tubing 19, as shown in FIG. 5.

Figure 6:
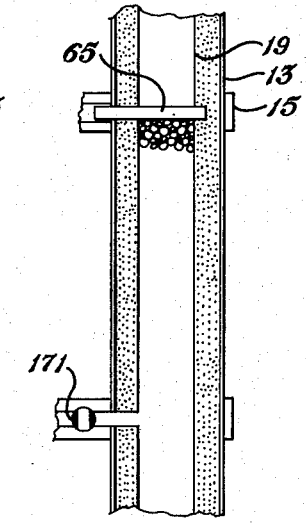
FIG. 6 is a simplified operational view similar to FIG. 5 showing the completed tap.

After closing valve 171, the cutter housing portion of the tool 23 is then removed from valve region 25 and moved down the casing 13 to the lower windows 21 and attached in the manner previously described. Another opening is then made in the production tubing 19 in an identical manner and bridging materials 219 are injected through valve 171 to block the tubing around cutter wedge 65 as shown in FIGS. 5 and 6. After closing valve 171, the cutter housing portion of the tool 23 can then be removed from the valve region as previously described.

The invention has significant advantages. By having a cutter motor which is independently operable from the feed motor, improved cutting action is achieved. By providing a counter associated with the feed motor the precise location of the cutter on the drive axis can be determined from a remote location thereby eliminating the need for an operator in the immediate vicinity of the blowout.

While the invention has been shown in only one of its forms, it should be apparent to those skilled in the art that it is not thus limited but is susceptible to various changes and modifications without departing from the spirit thereof.

I claim:

1. A device for tapping a fluid conductor, comprising;
    a cutter housing;
    mounting means for mounting said cutter housing on the exterior of said fluid conductor to be tapped;
    an externally threaded lead screw mounted in a fixed position within said cutter housing;
    an internally threaded feed nut threaded onto said lead screw, said feed nut threads mating with said lead screw threads so that said feed nut is rotatably movable along said lead screw exterior;
    a cutting cylinder surrounding said lead screw, said cutting cylinder having a leading cutting end and a trailing end, said trailing end being contacted by said feed nut as said feed nut moves along said lead screw exterior, thereby driving said cutting cylinder along a drive axis transverse to the longitudinal axis of said fluid conductor;
    a feed sleeve surrounding said cutting cylinder within said housing;
    slot means on said feed sleeve for engaging said feed nut whereby rotation of said feed sleeve causes rotation of said feed nut;
    a feed motor operably associated with said feed sleeve for rotating said feed sleeve;
    a drive sleeve positioned about said cutting cylinder in said housing;

engaging means on said drive sleeve for rotating said cutting cylinder;

a drive motor independent of said feed motor and operably associated with said drive sleeve for rotating said drive sleeve.

2. A device for tapping and plugging a fluid conductor, comprising:

a cutter housing;

mounting means for mounting said cutter housing on the exterior of said fluid conductor to be tapped and plugged;

an externally threaded lead screw mounted in a fixed position within said cutter housing;

an internally threaded feed nut threaded onto said lead screw, said feed nut threads mating with said lead screw threads so that said feed nut is rotatably movable along said lead screw exterior;

a cylindrical drive spindle surrounding said lead screw within said housing, said drive spindle having an upper extent and a lower extent, said lower extent being contacted by said feed nut as said feed nut moves along said lead screw exterior;

a cylindrical cutter having a cutting end for tapping said fluid conductor and an opposite end, said opposite end being connected to said drive spindle upper extent;

a feed sleeve surrounding said drive spindle within said housing;

slot means on said feed sleeve for engaging said feed nut wherey rotation of said feed sleeve causes rotation of said feed nut;

a feed motor operably associated with said feed sleeve for rotating said feed sleeve;

a drive sleeve positioned about said drive spindle in said housing;

engaging means on said drive sleeve for rotating said drive spindle;

a drive motor independent of said feed motor and operably associated with said drive sleeve for rotating said drive sleeve.

3. A device for tapping and plugging a fluid conductor, comprising:

a cutter housing;

mounting means for mounting said cutter housing on the exterior of said fluid conductor to be tapped and plugged;

an externally threaded lead screw mounted in a fixed position within said cutter housing;

an internally threaded feed nut threaded onto said lead screw said feed nut threads mating with said lead screw threads so that said feed nut is rotatably movable along said lead screw exterior;

at least one lug roller located on said feed nut exterior;

a cylindrical drive spindle surrounding said lead screw within said housing, said drive spindle having an upper extent and a lower extent, said lower extent being contacted by said feed nut as said feed nut moves along said lead screw exterior;

a cylindrical cutter having a cutting end for tapping said fluid conductor and an opposite end, said opposite end being connected to said drive spindle upper extent;

a feed sleeve surrounding said drive spindle within said housing, said feed sleeve having at least one interior longitudinal slot, said longitudinal slot being adapted to receive said feed nut lug roller whereby rotation of said feed sleeve causes rotation of said feed nut;

a feed motor operably associated with said feed sleeve for rotating said feed sleeve;

a drive sleeve positioned about said drive spindle in said housing;

engaging means on said drive sleeve for rotating said drive spindle;

a drive motor independent of said feed motor and operably associated with said drive sleeve for rotating said drive sleeve.

4. A drive for tapping and plugging a fluid conductor, comprising:

a cutter housing;

mounting means for mounting said cutter housing on the exterior of said fluid conductor to be tapped and plugged;

an externally threaded lead screw mounted in a fixed position within said cutter housing;

an internally threaded feed nut threaded onto said lead screw said feed nut threads mating with said lead screw threads so that said feed nut is rotatably movable along said lead screw exterior;

at least one lug roller located on said feed nut exterior;

a cylindrical drive spindle surrounding said lead screw within said housing, said drive spindle having an upper extent and a lower extent, said lower extent being contacted by said feed nut as said feed nut moves along said lead screw exterior;

a cylindrical cutter having a cutting end for tapping said fluid conductor and an opposite end, said opposite end being connected to said drive spindle upper extent;

a feed sleeve surrounding said drive spindle within said housing, said feed sleeve having at least one interior longitudinal slot, said longitudinal slot being adapted to receive said feed nut lug roller whereby rotation of said feed sleeve causes rotation of said feed nut;

a feed motor operably associated with said feed sleeve for rotating said feed sleeve;

a drive sleeve positioned about said drive spindle in said housing, said drive sleeve having drive dogs pivotally attached to said drive sleeve said drive dogs being adapted to selectively engage said drive spindle exterior at a predetermined point for rotating said drive spindle;

a drive motor independent of said feed motor and operably associated with said drive sleeve for rotating said drive sleeve.

5. The device of claim 4, wherein said feed sleeve has a driven gear formed in the exterior thereof and wherein said feed motor has a drive gear, said feed motor drive gear meshing with said feed sleeve driven gear for rotating said feed sleeve.

6. The device of claim 5, wherein said drive sleeve has a driven gear formed in the exterior thereof and wherein said drive motor has a drive gear, said drive motor drive gear meshing with said drive sleeve driven gear for rotating said drive sleeve.

7. The device of claim 6, wherein said mounting means comprises a bolt-on frame.

8. The device of claim 4, wherein said drive spindle upper extent and said cylindrical cutter end opposite said cutting end are connected by shear threads.

* * * * *